(12) United States Patent
Lashmore et al.

(10) Patent No.: US 12,011,913 B2
(45) Date of Patent: Jun. 18, 2024

(54) SYSTEMS AND METHODS FOR FORMATION AND HARVESTING OF NANOFIBROUS MATERIALS

(71) Applicant: Nanocomp Technologies, Inc., The Woodlands, TX (US)

(72) Inventors: David S. Lashmore, Lebanon, NH (US); Joseph J. Brown, Norwich, VT (US); Jared K. Chaffee, Hartland, VT (US); Bruce Resnicoff, Cornish, NH (US); Peter Antoinette, Nashua, NH (US)

(73) Assignee: Nanocomp Technologies Inc., The Woodlands, TX (US)

( * ) Notice: Subject to any disclaimer, the term of this patent is extended or adjusted under 35 U.S.C. 154(b) by 1765 days.

(21) Appl. No.: 16/013,640

(22) Filed: Jun. 20, 2018

(65) Prior Publication Data

US 2018/0297319 A1    Oct. 18, 2018

Related U.S. Application Data

(62) Division of application No. 14/633,765, filed on Feb. 27, 2015, now Pat. No. 10,029,442, which is a
(Continued)

(51) Int. Cl.
*B32B 5/26* (2006.01)
*B29C 65/78* (2006.01)
(Continued)

(52) U.S. Cl.
CPC ............ *B32B 5/26* (2013.01); *B29C 65/7858* (2013.01); *B29C 65/7897* (2013.01); *B32B 5/022* (2013.01); *B32B 7/05* (2019.01); *B82Y 30/00* (2013.01); *D01F 9/127* (2013.01); *D01F 9/133* (2013.01); *D01G 1/06* (2013.01); *D02G 3/02* (2013.01); *D04H 1/4242* (2013.01); *D04H 1/43838* (2020.05); *D04H 1/43914* (2020.05); *D04H 1/44* (2013.01); *D04H 1/72* (2013.01); *D04H 1/728* (2013.01); *D04H 1/74* (2013.01); *B32B 2250/20* (2013.01); *B32B 2262/106* (2013.01); *B32B 2307/54* (2013.01);
(Continued)

(58) Field of Classification Search
None
See application file for complete search history.

(56) References Cited

U.S. PATENT DOCUMENTS

2008/0170982 A1\* 7/2008 Zhang ................ D02G 3/44
423/447.3

\* cited by examiner

*Primary Examiner* — Guinever S Gregorio
(74) *Attorney, Agent, or Firm* — Nanocomp Technologie Inc.; David K. Wooten

(57) ABSTRACT

A system that receives nanomaterials, forms nanofibrous materials therefrom, and collects these nanofibrous materials for subsequent applications. The system include a housing coupled to a synthesis chamber within which nanotubes are produced. A spindle may extend from within the housing, across the inlet, and into the chamber for collecting nanotubes and twisting them into a yarn. A body portion may be positioned at an intake end of the spindle. The body portion may include a pathway for imparting a twisting force onto the flow of nanotubes and guide them into the spindle for collection and twisting into the nanofibrous yarn. Methods and apparatuses for forming nanofibrous are also disclosed.

11 Claims, 4 Drawing Sheets

Related U.S. Application Data division of application No. 13/191,109, filed on Jul. 26, 2011, now Pat. No. 8,999,285, which is a division of application No. 11/488,387, filed on Jul. 17, 2006, now Pat. No. 7,993,620.

(60) Provisional application No. 60/703,328, filed on Jul. 28, 2005.

(51) Int. Cl.
| | |
|---|---|
| *B32B 5/02* | (2006.01) |
| *B32B 7/05* | (2019.01) |
| *B82Y 30/00* | (2011.01) |
| *D01F 9/127* | (2006.01) |
| *D01F 9/133* | (2006.01) |
| *D01G 1/06* | (2006.01) |
| *D02G 3/02* | (2006.01) |
| *D04H 1/4242* | (2012.01) |
| *D04H 1/4382* | (2012.01) |
| *D04H 1/4391* | (2012.01) |
| *D04H 1/44* | (2006.01) |
| *D04H 1/72* | (2012.01) |
| *D04H 1/728* | (2012.01) |
| *D04H 1/74* | (2006.01) |

(52) U.S. Cl.
CPC ..... *B32B 2307/552* (2013.01); *B32B 2457/00* (2013.01); *B32B 2551/00* (2013.01); *D10B 2101/122* (2013.01); *Y10S 977/742* (2013.01); *Y10S 977/842* (2013.01); *Y10T 442/60* (2015.04); *Y10T 442/654* (2015.04); *Y10T 442/699* (2015.04)

SYSTEMS AND METHODS FOR FORMATION AND HARVESTING OF NANOFIBROUS MATERIALS

RELATED US APPLICATION(S)

The present application is a divisional application of U.S. patent application Ser. No. 14/633,765 filed Feb. 27, 2015, which is a divisional application of U.S. patent application Ser. No. 13/191,109, filed Jul. 16, 2011, now U.S. Pat. No. 8,999,285, which is a divisional application of U.S. patent application Ser. No. 11/488,387, filed Jul. 17, 2006, now U.S. Pat. No. 7,993,620, which claims priority to U.S. Provisional Patent Application Ser. No. 60/703,328, filed Jul. 28, 2005, each of which is incorporated herein by reference.

TECHNICAL FIELD

The present invention relates to systems for formation and harvesting of nanofibrous materials, and more particularly to the formation of yarns and non-woven sheets from nanotubes, nanowires, or other filamentous structures having nanoscale dimensions.

BACKGROUND ART

Carbon nanotubes are known to have extraordinary tensile strength, including high strain to failure and relatively high tensile modulus. Carbon nanotubes may also be highly resistant to fatigue, radiation damage, and heat. To this end, the addition of carbon nanotubes to composite materials can increase tensile strength and stiffness of the composite materials.

Within the last fifteen (15) years, as the properties of carbon nanotubes have been better understood, interests in carbon nanotubes have greatly increased within and outside of the research community. One key to making use of these properties is the synthesis of nanotubes in sufficient quantities for them to be broadly deployed. For example, large quantities of carbon nanotubes may be needed if they are to be used as high strength components of composites in macroscale structures (i.e., structures having dimensions greater than 1 cm.)

One common route to nanotube synthesis can be through the use of gas phase pyrolysis, such as that employed in connection with chemical vapor deposition. In this process, a nanotube may be formed from the surface of a catalytic nanoparticle. Specifically, the catalytic nanoparticle may be exposed to a gas mixture containing carbon compounds serving as feedstock for the generation of a nanotube from the surface of the nanoparticle.

Recently, one promising route to high-volume nanotube production has been to employ a chemical vapor deposition system that grows nanotubes from catalyst particles that "float" in the reaction gas. Such a system typically runs a mixture of reaction gases through a heated chamber within which the nanotubes may be generated from nanoparticles that have precipitated from the reaction gas. Numerous other variations may be possible, including ones where the catalyst particles may be pre-supplied.

In cases where large volumes of carbon nanotubes may be generated, however, the nanotubes may attach to the walls of a reaction chamber, resulting in the blockage of nanomaterials from exiting the chamber. Furthermore, these blockages may induce a pressure buildup in the reaction chamber, which can result in the modification of the overall reaction kinetics. A modification of the kinetics can lead to a reduction in the uniformity of the material produced.

An additional concern with nanomaterials may be that they need to be handled and processed without generating large quantities of airborne particulates, since the hazards associated with nanoscale materials are not yet well understood.

The processing of nanotubes or nanoscale materials for macroscale applications has steadily increased in recent years. The use of nanoscale materials in textile fibers and related materials has also been increasing. In the textile art, fibers that are of fixed length and that have been processed in a large mass may be referred to as staple fibers. Technology for handling staple fibers, such as flax, wool, and cotton has long been established. To make use of staple fibers in fabrics or other structural elements, the staple fibers may first be formed into bulk structures such as yarns, tows, or sheets, which then can be processed into the appropriate materials.

Long nanotubes, which may have dimensions of 20 nm or less in diameter and 10 microns or more in length, can have relatively high aspect ratios. These nanotube fibers, when produced in large quantities from, for instance, chemical vapor deposition, may be used as a new source of staple fibers despite being smaller than most other textile staple fibers.

Accordingly, it would be desirable to provide a system and an approach to collect and handle synthesized nanotubes that can minimize the generation air-borne particulates, and in such a way as to permit processing of the nanotubes into a fibrous material of high strength for subsequent incorporation into various applications, structural or otherwise.

SUMMARY OF THE INVENTION

The present invention, in one embodiment, provides a system for forming nanofibrous materials, such as yarn. The system includes a housing having an inlet for engaging an independent synthesis chamber within which nanotubes may be produced. The system also includes a spindle having an intake end, an opposing outlet end, and a pathway therebetween. In an embodiment, the spindle extends from within the housing, across the inlet and into the chamber for collecting the nanotubes through the intake end and for subsequently twisting the nanotubes into a nanofibrous yarn. The system further includes a spool positioned within the housing and downstream of the spindle for winding thereonto the yarn from the spindle. A sensor system can also be provided to generate feedback data to control a rate of spin of the spindle and spool, so as to avoid compromising the integrity of the yarn as it is being wound about the spool. In one embodiment, a guide arm may be provided between the spindle and spool to direct the yarn exiting from the spindle onto the spool for subsequent winding.

The present invention provides, in another embodiment, a system for forming a nanofibrous non-woven sheet. The system includes a housing having an inlet for engaging an independent synthesis chamber within which nanotubes may be produced. The system also includes a moving surface positioned adjacent the inlet within the housing for collecting and transporting the nanotubes flowing from the synthesis chamber. A pressure applicator may be situated adjacent the moving surface to apply a force against the collected nanotubes on the moving surface, so as to compact the nanotubes into a non-woven sheet of intermingled nanotubes. The system further includes a spool positioned within the housing and downstream of the pressure applicator for winding thereonto the non-woven sheet. A separator may also be provided to apply a material on to one side of the non-woven sheet prior to the sheet being wound about the spool to minimize bonding of the non-woven sheet to itself. The system can also include a sensor system to generate feedback data to control a rate of spin of the moving surface and spool, so as to avoid compromising the integrity of the yarn as it is being wound about the spool.

The present invention, in a further embodiment, provides a method for forming a nanofibrous yarn. The method includes receiving a plurality of synthesized nanotubes moving substantially in one direction. The environment may be an airtight environment. In an embodiment, prior to receiving, a vortex flow may be imparted on to the nanotubes so as to provide an initial twisting. Next, the nanotubes may be twisted together into a yarn in a direction substantially transverse to the direction of movement of the nanotubes. Thereafter, the yarn may be moved toward an area for harvesting and subsequently harvested by winding the yarn about an axis substantially transverse to a direction of movement of the yarn. The rate of winding may be controlled so as to avoid compromising the integrity of the yarn.

The present invention also provides a method for forming a nanofibrous non-woven sheet. The method includes depositing a plurality of synthesized nanotubes onto a surface and subsequently transporting the nanotubes away from a point of deposition. Next, pressure may be applied onto the plurality of nanotubes against the surface, so as to compact the nanotubes into a non-woven sheet of intermingled nanotubes. The non-woven sheet may then be directed toward an area for harvesting. In an embodiment, a material may be put onto one side of the non-woven sheet to prevent the sheet from bonding to itself. The non-woven sheet may subsequently be harvested by winding the sheet about an axis substantially transverse to a direction of movement of the sheet. In an embodiment, The rate of winding may be controlled so as to avoid compromising the integrity of the non-woven sheet.

The present invention, in a further embodiment, provides an apparatus for presenting synthesized nanotubes in a twisting manner for subsequent formation of nanofibrous materials. The apparatus includes a body portion having a pathway through which synthesized nanotubes may flow. The apparatus may also include a cap portion attached to a distal end of the body portion and having an opening through which the nanotubes may exit. A channel may be situated between the cap portion and the body portion circumferentially about the pathway. The apparatus may further include a plurality of exit ports, positioned within the channel, in fluid communication with the pathway, so as to impart a vortex flow into the pathway. In this way, nanotubes flowing through the pathway can be presented in a twisting manner after exiting the distal end of the body portion.

The present invention also provides another apparatus for presenting synthesized nanotubes for subsequent formation of nanofibrous materials. The apparatus includes a disc having a proximal end and a distal end. A passageway, in one embodiment, extends between the proximal end and a distal end. The apparatus also includes a constricted portion at the distal end of the passageway to permit accumulation of the nanotubes thereat. To that end, the constricted portion at the distal end may provide a source from which nanotubes may be presented for subsequent formation of nanofibrous materials.

DESCRIPTION OF SPECIFIC EMBODIMENTS

Nanotubes for use in connection with the present invention may be fabricated using a variety of approaches. Presently, there exist multiple processes and variations thereof for growing nanotubes. These include: (1) Chemical Vapor Deposition (CVD), a common process that can occur at near ambient or at high pressures, (2) Arc Discharge, a high temperature process that can give rise to tubes having a high degree of perfection, and (3) Laser ablation. It should be noted that although reference is made below to nanotube synthesized from carbon, other compound(s) may be used in connection with the synthesis of nanotubes for use with the present invention.

The present invention, in one embodiment, employs a CVD process or similar gas phase pyrolysis procedures well known in the industry to generate the appropriate nanotubes. In particular, since growth temperatures for CVD can be comparatively low ranging, for instance, from about 600° C. to about 1300° C., carbon nanotubes, both single wall (SWNT) or multiwall (MWNT), may be grown, in an embodiment, from nanostructural catalyst particles supplied by reagent carbon-containing gases (i.e., gaseous carbon source).

Moreover, the strength of the SWNT and MWNT generated for use in connection with the present invention may be about 30 GPa maximum. Strength, as should be noted, is sensitive to defects. However, the elastic modulus of the SWNT and MWNT fabricated for use with the present invention is typically not sensitive to defects and can vary from about 1 to about 1.5 TPa. Moreover, the strain to failure, which generally can be a structure sensitive parameter, may range from a few percent to a maximum of about 10% in the present invention.

Figure 1:
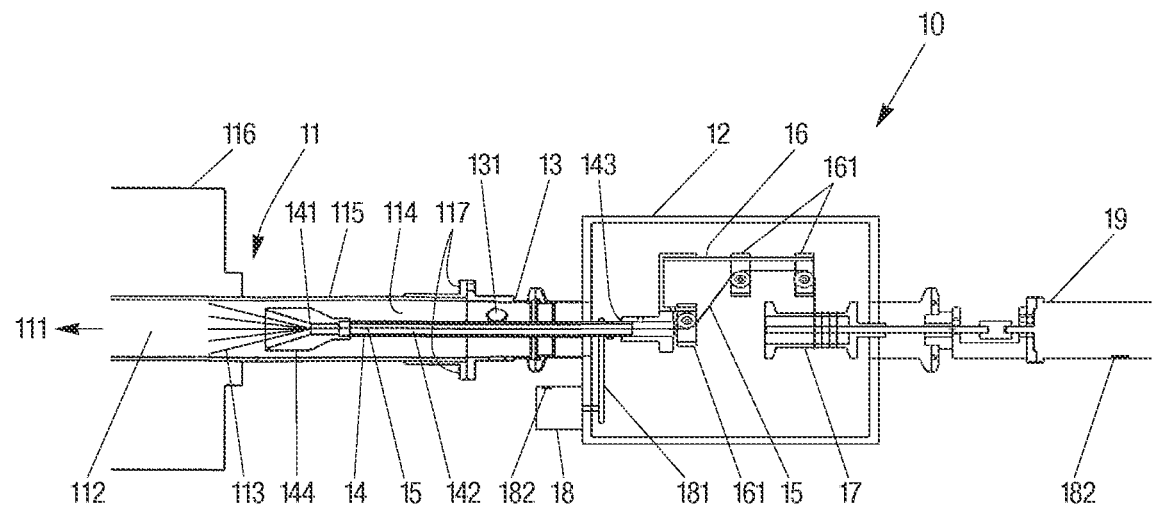
FIG. 1 illustrates a system for formation and harvesting of nanofibrous materials in accordance with one embodiment of the present invention.

Referring now to FIG. 1, there is illustrated a system 10 for collecting and extended length nanotubes produced by a CVD process within a synthesis chamber 11, and for subsequently forming fibrous structures or materials, such as yarn, from the nanotubes. Synthesis chamber 11, in general, includes an entrance end 111, into which reaction gases may be supplied, a hot zone 112, where synthesis of extended length nanotubes 113 may occur, and an exit end 114 from which the products of the reaction, namely the extended length nanotubes 113 and exhaust gases, may exit and be collected. In one embodiment, synthesis chamber 11 may be a quartz tube 115, extending through a furnace 116, and may include flanges 117 provided at exit end 114 and entrance end 114 for sealing tube 115. Although illustrated as such in FIG. 1, it should be appreciated that other configurations may be employed in the design of synthesis chamber 11.

System 10, in one embodiment of the present invention, includes a housing 12. Housing 12, as illustrated in FIG. 1, may be substantially airtight to minimize the release of potentially hazardous airborne particulates generated from within the synthesis chamber 11 into the environment, and to prevent oxygen from entering into the system 10 and reaching the synthesis chamber 11. It should be appreciated that the presence of oxygen within the synthesis chamber 11 can compromise the production and affect the integrity of the extended nanotubes 113.

System 10 also include an inlet 13 for engaging the flanges 117 at exit end 114 of synthesis chamber 11 in a substantially airtight manner. In one embodiment, inlet 13 may include at least one gas exhaust 131 through which gases and heat may leave the housing 12. Gas exiting from exhaust 131, in an embodiment, may be allowed to pass through a liquid, such as water, or a filter to collect nanomaterials not gathered on to a rotating spindle 14 upstream of the exhaust 10. In addition, the exhaust gas may be exposed to a flame and air in order to de-energize various components of the exhaust gas, for instance, reactive hydrogen may be oxidized to form water.

Rotating spindle 14, as shown in FIG. 1, may be designed to extend from within housing 12, through inlet 13, and into synthesis chamber 11 for collection of extended length nanotubes 113. In an embodiment, rotating spindle 14 may include an intake end 141 into which a plurality of nanotubes may enter and be spun into a yarn 15. In an embodiment, the direction of spin may be substantially transverse to the direction of movement of the nanotubes 113. Rotating spindle 14 may also include a pathway, such as hollow core 142, along which yarn 15 may be guided toward outlet end 143 of spindle 14. The intake end 141 of rotating spindle 14 may include a variety of designs. In one embodiment, intake end 141 may simply include an aperture (not shown) through which the nanotubes 113 may enter. Alternatively, it may include a funnel-like structure 144 that may serve to guide the nanotubes 113 into the intake end 141. Structure 144 can also serve to support yarn 15, should it break, until such time that it might be able to reconstitute itself from the twisting with newly deposited nanotubes 113. In one embodiment, a roller, capstan or other restrictive devices (not shown) may be provided adjacent the intake end 141 of spindle 14 in order to: (1) serve as a point from which yarn 15 may be twisted, and (2) prevent springiness in yarn 15 from pulling the yarn too quickly into the core 142 of spindle 14, which can prevent yarn 15 from re-forming if it were to break.

System 10 further includes a guide arm 16 which may be coupled to the outlet end 143 of rotating spindle 14 to guide and direct yarn 15 toward a spool 17 for gathering thereon. In accordance with one embodiment of the present invention, a set of pulleys 161, eyelets, or hooks may be provided as attachments to the guide arm 16 to define a path on which yarn 15 may be directed along the guide arm 16. Alternatively, yarn 15 may be permitted to pass through a tubular structure (not shown) that can direct yarn 15 from the outlet end 143 of spindle 14 to a point from which yarn 15 may be wound onto spool 17.

Guide arm 16 and rotating spindle 14, in an embodiment, may work together to induce twisting in yarn 15. The rotation of spindle 14 and guide arm 16, as shown in FIG. 1, may be mechanically driven, for example, by an electric motor 18 coupled to the spindle 14 via a belt 181, for instance.

Spool 17, situated within housing 12, may be positioned, in one embodiment, downstream of guide arm 16 for the harvesting of yarn 15. In particular, yarn 15 advancing from guide arm 16 may be directed on to a spinning spool 17, such that yarn 15 may thereafter be wound circumferentially about spool 17. Although shown to be in axial alignment with rotating spindle 14, it should be appreciated that spool 17 may be placed at any other location within housing 12, so long as spool 17 may be spun about its axis to collect yarn 15 from guide arm 16. In an embodiment the axis of spin of spool 17 may be substantially transverse to the direction of movement of yarn 15 onto spool 17.

To impart rotation to spool 17, an additional mechanical drive 19 may be coupled to spool 17. In one embodiment, spool 17 may be synchronized to spin or rotate near or at substantially a similar rotation rate as that of spindle 14 to permit uniform harvesting of yarn 15 on to spool 17. Otherwise, if, for instance, the rate of rotation of spool 17 is faster than that of spindle 14, breakage of yarn 15 from guide arm 16 to spool 17 may occur, or if the rate is slower than that of spindle 14, loose portions from yarn 15 may end up entangled.

To maintain substantial synchronization of rotation rates, movement of mechanical drives 18 and 19 may be adjusted by a control system (not shown). In one embodiment, the control system may be designed to receive data from position sensors, such as optical encoders 182, attached to each of mechanical drives 17 and 18. Subsequently, based on the data, the control system may use a control algorithm in order to modify power supplied to each drive in order to control the rate of each drive so that they substantially match the rate of nanotube synthesis. As a result, the control system can impart: (1) constant yarn velocity controlled by set tension limits, or (2) constant tension controlled by velocity limits. In one embodiment, the yarn velocity can be reset in real time depending on the tension values, so that the tension may be kept within a preset limit. In addition, the yarn tension can be reset in real time depending on the velocity values, so that the tension can be kept within a set value.

The control system can also vary the rate between the spool 17 and spindle 14, if necessary, to control the yarn up-take by the spool 17. In addition, the control system can cause the spool 17 to move back and forth along its axis, so as to permit the yarn 15 to be uniformly wound thereabout.

In operation, under steady-state production using a CVD process of the present invention, extended length nanotubes may be collected from within the synthesis chamber 11 and yarn 15 may thereafter be formed. In particular, as the nanotubes 113 emerge from the synthesis chamber 11, they may be collected into a bundle, fed into the intake end 141 of spindle 14, and subsequently spun or twist into yarn 15 therewithin. It should be noted that a continual twist to yarn 15 can build up sufficient angular stress to cause rotation near a point where new nanotubes 113 arrive at the spindle 14 to further the yarn formation process. Moreover, a continual tension may be applied to yarn 15 or its advancement may be permitted at a controlled rate, so as to allow its uptake circumferentially about spool 17.

Typically, the formation of yarn 15 results from a bundling of nanotubes 113 that may subsequently be tightly spun into a twisting yarn. Alternatively, a main twist of yarn 15 may be anchored at some point within system 10 and the collected nanotubes 113 may be wound on to the twisting yarn 15. Both of these growth modes can be implemented in connection with the present invention.

Figure 2:
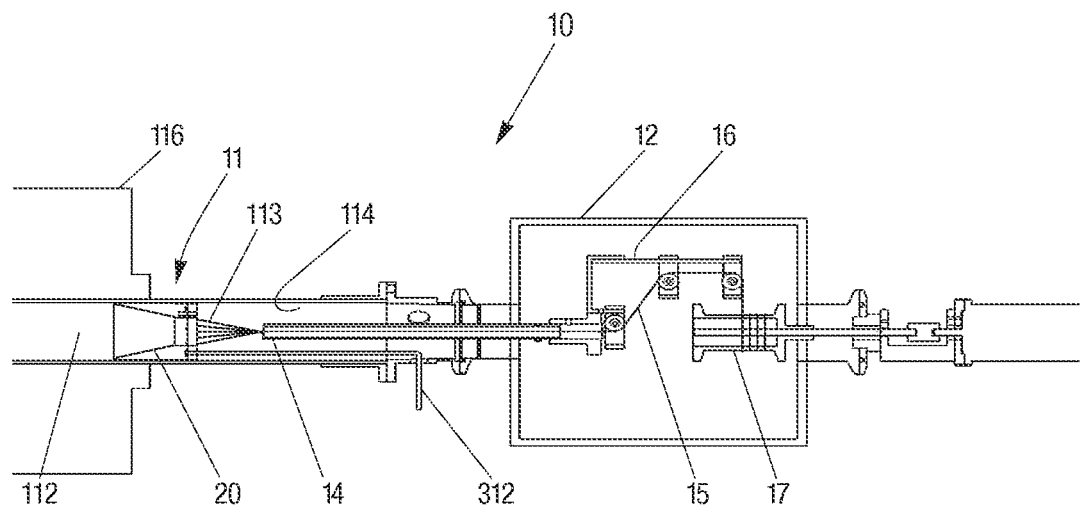
FIG. 2 illustrates a variation of the system shown in FIG. 1.

Looking now at FIG. 2, a vortex generator, such as gas-spinner 20, may be provided toward the exit end 114 of synthesis chamber 11 to generate a substantial vortex flow in order to impart a twisting motion to the nanotubes 113 prior to being directed into spindle 14 and spun into yarn 15. The generation of a vortex to impart twisting motion may also serve to even out an amount of nanotube material used in the formation of yarn 15. Gas-spinner 20, as illustrated in FIGS. 3A-B, may be designed to include a cap portion 31, a body portion 32, and a channel 33 positioned circumferentially about the gas-spinner 20 between the cap portion 31 and body portion 32.

The cap portion 31, in an embodiment, includes a duct 311 through which an inert gas from a supply line 312 may enter into channel 33 of the gas-spinner 30 for subsequent generation of a vortex flow. Examples of an inert gas for use in connection with the gas-spinner 20 includes, He, Ar or any other suitable inert gases.

Figure 3A:
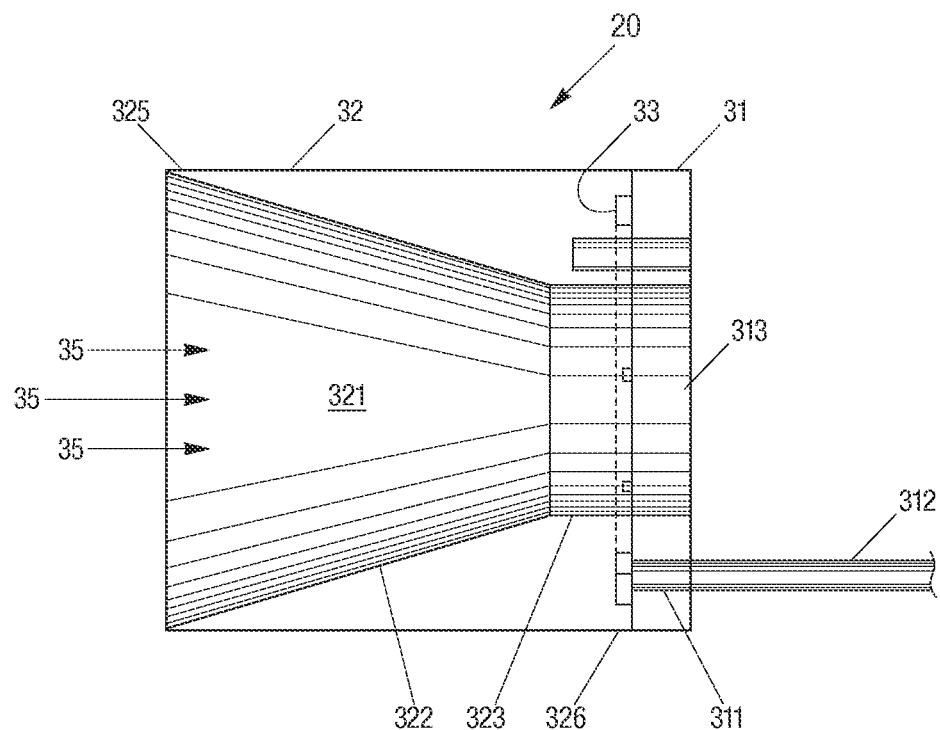
FIG. 3 A-B illustrate a vortex generator for use in connection with the system shown in FIG. 1.
Figure 3B:
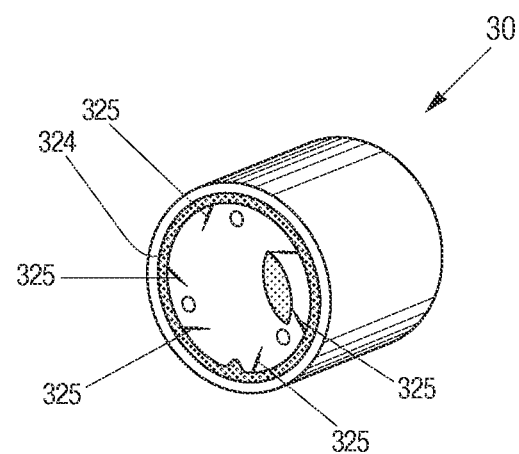

The body portion 32, on the other hand, includes an axisymmetric pathway 321, through which gas (i.e., fluid) and fibrous nanomaterials (i.e., nanotubes 113) generated from hot zone 112 of the synthesis chamber 11 may flow (arrrows 35 in FIG. 3A). In one embodiment, pathway 321 includes a tapered portion 322 adjacent a proximal end 325 of the body portion 32 and a substantially uniform portion 323 adjacent a distal end 326 of the body portion 32. With such a design, the tapered portion 322 and the uniform portion 323 can act together to minimize over-accumulation or build-up of nanotubes 113 upstream of the spindle 14. Specifically, pathway 321 can act to guide the nanotubes 113 into the tapered portion 322 and across the uniform portion 323, so that nanotubes 113 generated from the synthesis chamber 11 may avoid being caught on sharp edges or other protruding obstructions within the synthesis chamber 11. To permit nanotubes to exit from pathway 321, cap portion 31 includes an opening 313, in substantial axial alignment with the uniform portion 323 of pathway 321.

The body portion 32 may also include a recess 324, which upon an engagement between the body portion 32 and cap portion 31, becomes channel 33. The body portion 32 may further include exit ports 325 positioned within recess 324. In one embodiment, exit ports 325 may be symmetrically distributed about the uniform portion 323 to subsequently generate, within the uniform portion 323 of pathway 321, a vortex flow from the inert gas previously introduced into channel 33. It should be appreciated that since vortex flow requires a tangential velocity vector component around a given axis, e.g., axis of symmetry of gas-spinner 30, in order to provide this tangential velocity component, the exit ports 325, as illustrated in FIG. 3B, may need to be positioned in a plane normal to the axis of symmetry, and in such a way that each exit port 325 enters the uniform portion 323 of the pathway 321 at a substantially non-perpendicular angle. In other words, each exit port 325 needs to be in tangential communication with the pathway 321, so that fluid (e.g., inert gas) within channel 33, when permitted to move across each exit port 325, can flow into the uniform portion 323 of pathway 321 in a tangential manner.

It should also be appreciated that by providing a solid constriction to the flow of gas and generated nanomaterials, the gas-spinner 20 can also allow substantial freedom in defining yarn and tow formation modes for system 10 of the present invention. Moreover, to the extent necessary, gas-spinner 20 can provide an area where nanotubes 113 may accumulate, particularly when the gas supplied through the gas-spinner 20 is at a low flow rate to create a source from which nanotubes 113 may be pulled, such as that by a leader (see description below) to subsequently twist into yarn 15.

Figures 7A, 7B:
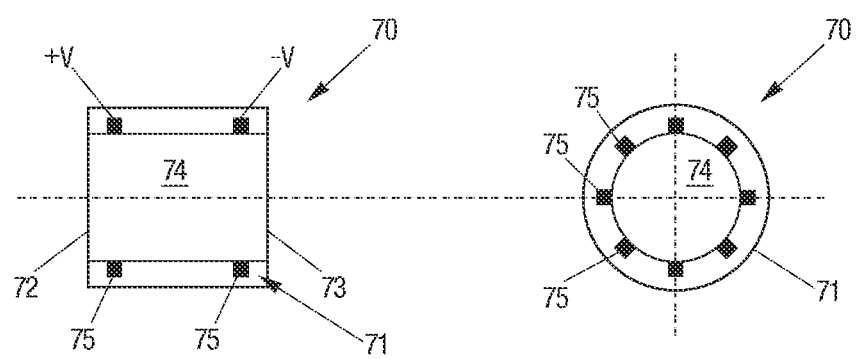
FIGS. 7 A-B illustrate another vortex generator for use in connection with the system shown in FIG. 1.

In an alternate embodiment, a different vortex generator, such electrostatic spinner 70, as illustrated in FIGS. 7A-B, may be used to impart a substantial vortex flow to the nanotubes 113 prior to directing the nanotubes 113 into spindle 14 where they may be spun into yarn 15. Electrostatic spinner 70, in an embodiment, includes a substantially tubular body 71 having an entry end 72, an exit end 73, and a pathway 74 extending therebetween. The electrostatic spinner 70 may also include a plurality of electrical contacts 75 situated circumferentially about the pathway 74. Each contact 75 includes a positive end +V and a negative end −V, and can be made from a metallic material, such as copper. In this regard, a voltage may be applied to each of the contacts 75 to generate an electric field. Moreover, as voltage may be applied to each contact 75 in succession, a rotating electrostatic field may be generated. Since the nanotubes 113 have a substantially high aspect ratio and since they can be conductors, the nanotubes 113 may be attracted to the electrostatic field and move in a vortex or winding manner as the field moves about the pathway 74. It should be noted that the winding motion imparted to the nanotubes 113 may be substantially transverse to the direction along which the nanotubes 113 may move from the entry end 72 to the exit end 73 of the body portion 71. To control the application of voltage to each successive contact 75, any commercially available controller chip or processor may be used.

In accordance with one embodiment of the present invention, at the inception of formation of yarn 15, it may be beneficial to start the yarn with a "leader." This leader, for example, may be an additional piece of nanotube yarn, some other type of yarn or filament, or a thin wire. In an embodiment, a wire may be used because it can provide the requisite stiffness necessary to transfer the twisting motion of the spindle 14 to the accumulating webbing or bundle of nanotubes 113 until there exist a sufficient build-up, such that the wire can tether an end of a growing yarn. The wire used, in one embodiment, may be, for example, a ferrous wire or nichrome, since these alloys can withstand the temperature within the hot zone (600° C.-1300° C.) of the synthesis chamber 11. Moreover, nanotubes produced via a CVD process have been observed to adhere relatively well to these alloys. In particular, since catalytic nanoparticles at the end of the nanotubes 113 may include ferromagnetic materials, such as Fe, Co, Ni, etc., these nanoparticles can magnetically attract to the magnetic domains on the ferrous alloy materials.

To the extent that a leader is provided, it may be necessary to pre-thread the leader before the start of the reaction. Specifically, a hole, in one embodiment, may provided in the spool 17 to serve as an anchor point for one end of the leader. Additionally, notches or slots may be provided in the guide pulleys 161 to permit the leader to be easily inserted into the guide arm 16. The leader may then be inserted into the spindle 14, and thereafter advanced into the synthesis chamber 11 upstream to gas-spinner 20, should one be employed.

Figure 4:
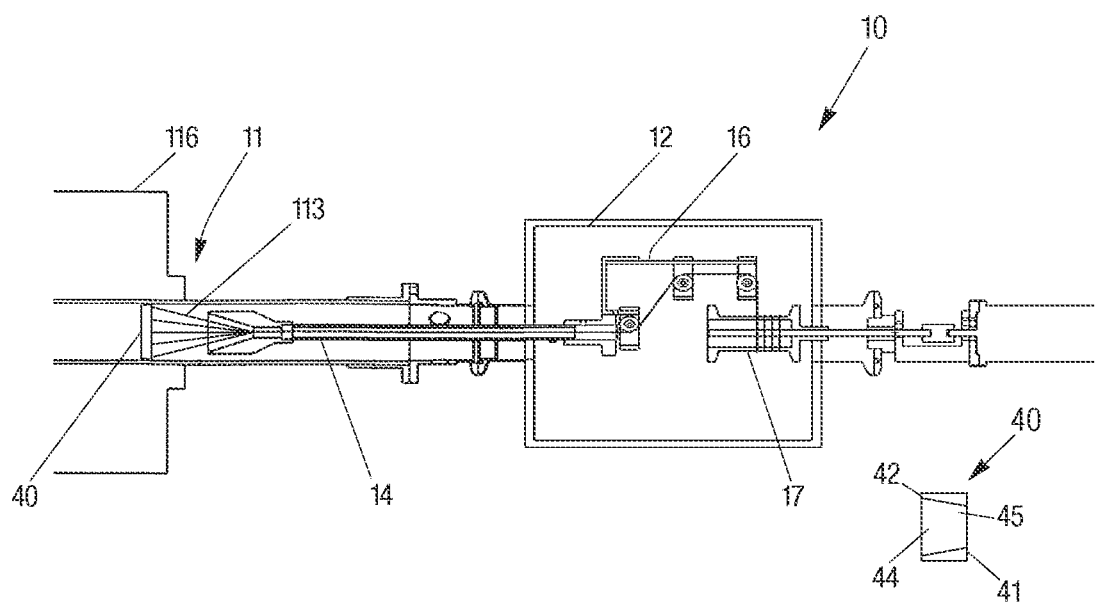
FIG. 4 illustrates another variation of the system shown in FIG. 1.

Looking at FIG. 4, when using a leader, an anchor 40 may be provided in place of gas-spinner 20 to provide a source from which the leader can pull nanotubes into the spindle 14 to initiate the yarn making process. In an embodiment, anchor 40 may be positioned toward the exit end 114 of synthesis chamber 11 to constrict the flow of gas and nanotubes 113 so that an accumulation of nanotubes 113 can be generated within the anchor 40. To do so, anchor 40 may be designed as a disc having a distal end 41, a proximal end 42, and a passageway 44 extending therebetween. As illustrated in FIG. 4, passageway 44 may taper from the proximal end 42 toward the distal end 41. In this manner, when nanotubes 113 enter passageway 44 toward constricted portion 45, the constricted portion 45 may act to accumulate nanotubes 113 thereat to provide a source for the leader. Although provided as being tapered or toroidal in shape, it should be appreciated that passageway 44 of anchor 40 may be designed to include a variety of forms, so long as it works to constrict the flow of gas and nanotubes 113 in chamber 11.

To enhance the accumulation of nanotubes there at, projections (not shown) or other similar designs may be provided at the constricted portion 45 to provide a surface to which a webbing or bundle of nanotubes 113 can attach. In one embodiment, anchor 40 can be positioned near furnace 116 where the nanotubes 113 may have a relatively greater tendency to adhere to solid surfaces. As it may be near furnace 16, anchor 40 may be made, in an embodiment, from a graphite material or any other material that would withstanding heat from furnace 16.

Assuming that the nanotubes 113 can be produced at a constant rate, the design and location of anchor 40 near furnace 116 can permit the nanotubes 113 to accumulate thereon at a uniform rate. To that end, a controlled source of nanotubes 113 may be generated for subsequent collection and formation of yarn 15 having substantially uniform properties. Furthermore, anchor 40 can act to provide a point from which the nanotubes 113 can be pulled to permit substantial alignment of the nanotubes 113 in a direction substantially coaxial with yarn 15. The ability to align the nanotubes 113 along an axis of yarn 15 can enhance load transfer between the nanotubes 113 to allow for the formation of a high strength yarn 15. Nevertheless, it should be appreciated that yarn 15 can be formed regardless of whether anchor 40 is present.

Synthesis and harvesting of yarn 15 may subsequently be initiated by causing the spool 17, spindle 14, guide arm 16, and leader to rotate. In one embodiment, after initiating the synthesis of nanotubes 113, the nanotubes 113 may be directed toward the leader to permit build-up or bundling of the nanotubes 113 thereon. Thereafter, once a webbing or bundling of nanotubes 113 begins to build up on the leader, and the leader can be withdrawn by causing the spool 17 to rotate at a slightly different rate than the spindle 14 and guide arm 16. The formation of the nanotube yarn 15, as described above, may proceed automatically thereafter once the leader has been withdrawn sufficiently from the hot zone 112 of synthesis chamber 11. In particular, the webbing of nanotubes 113 may be twisted into a yarn 15 at a point near the intake end 141 of spindle 14. The twisted portions of yarn 15 may then be allowed to move along the core 142 towards the outlet end 143 of spindle 14. Upon exiting the outlet end 143, the yarn 15 may be guided along guide arm 16 and directed toward the spool 17. The yarn 15 may thereafter be wound about the spool 17 at a controlled rate.

In accordance with another embodiment, the system 10 may also be used for continuous formation of a tow (not shown) from nanotubes 113 synthesized within synthesis chamber 11. This tow may be later processed into a tightly wound yarn, similar to technologies common in the art of thread and yarn formation. In one embodiment, the tow may be collected using the hollow spindle 14, guide arm 16 and spool 17, as described above. The formed tow may extend from the spool 17, through the guide arm 16 and spindle 14 into the synthesis chamber 11 near the exit end 114. Nanotubes 113, in an embodiment, may accumulate on the tow by winding around the tow, as the tow spins rapidly and is slowly withdrawn. An anchor may not required for this mode of operation. However, should it be necessary to provide a point to which the growing end of the spinning tow may attach, an anchor may be used.

The formation of a yarn or tow in accordance with one embodiment of the present invention provides an approach to producing a relatively long fibrous structure capable of being employed in applications requiring length. In particular, the twisting action during formation of the yarn allows the staple fibers (i.e., nanotubes) to be held together into the larger fibrous structure (i.e., yarn). Additionally, the twisting of axially aligned fibers (i.e., nanotubes) can enhance load transfer between the fibers to allow for the formation of a high strength yarn.

Specifically, staple fibers, such as the nanotubes synthesized by the process of the present invention, can be provided with a high aspect ratio (e.g., >100:1 length:diameter). As a result, they can serve better than those with smaller aspect ratios to transfer structural loads between individual fibers within a yarn. While fibers with essentially infinite aspect ratio would be ideal, the length scale of structures in which the yarn may be incorporated better defines the length and aspect ratios required of the constituent fibers. For example, if it is necessary to bridge a distance of only one to two centimeters, fibers much longer than this distance may not required. Furthermore, within a yarn, load transfer typically occurs as an interaction between each of the contact points of adjacent fibers. At each contact point, each fiber may interact via, for example, a van der Waal's bond, hydrogen bond, or ionic interaction. As such, the presence of a plurality of fibers in the yarn of the present invention can increase the number of contact points and thus the bonding interaction between adjacent fibers to enhance load transfer between the fibers. Moreover, since twisting can further increase the number of contact points between constituent fibers in a yarn by forcing individual fibers closer together, it can be advantageous to the overall strength of the yarn to impart twisting. In this regard, the ability to independently control twisting and up-take velocity can be important in order to optimize strength.

The strength of the yarn can further be enhanced by increasing the bond strength between adjacent fibers. In one embodiment, the yarn may be impregnated with a matrix material, such as a polymer, or a surfactant molecule to crosslink adjacent fibers. Crosslinking the fibers using covalent or ionic chemical bonds can provide an additional means of improving the overall strength of the yarn.

It should be noted that since the number of contact points increases the opportunities for phonon or electron to transfer between adjacent nanotubes, the imparting of a twist to the yarn can also enhance the electrical and thermal conductivity of the yarn of the present invention.

Figure 5:
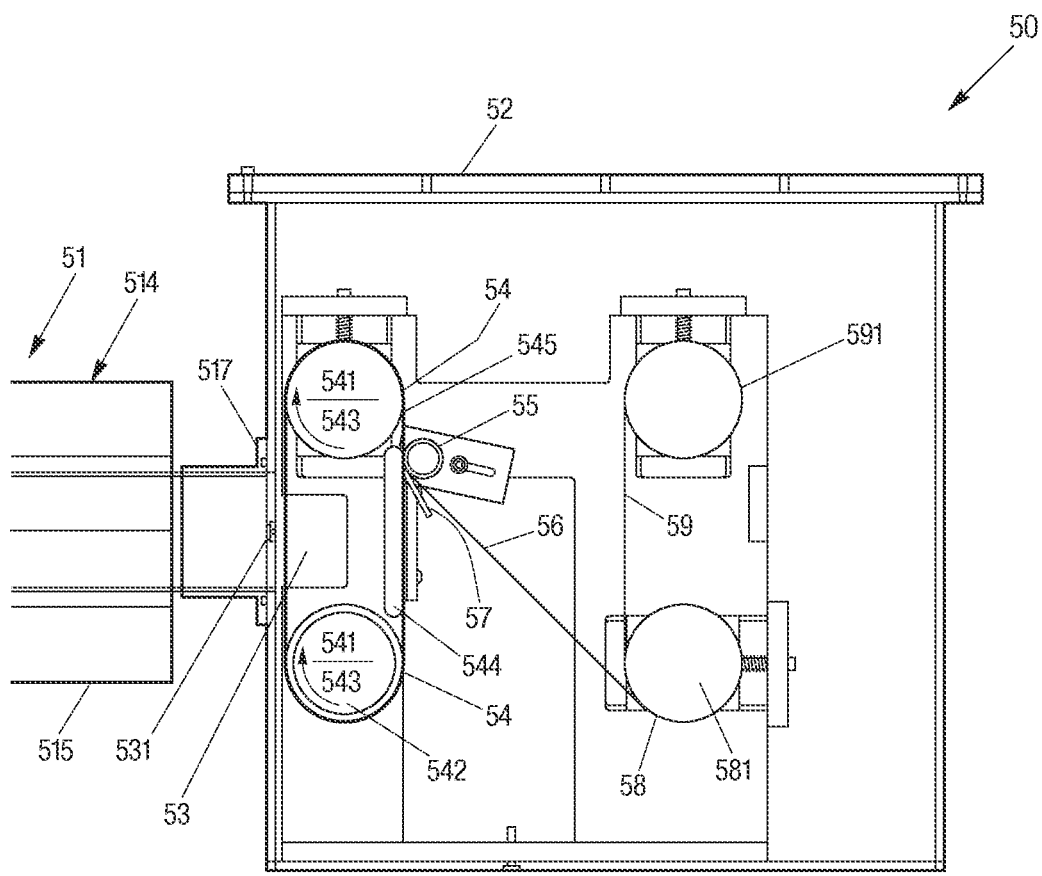
FIGS. 5-6 illustrate another system of the present invention for formation and harvesting of nanofibrous materials.
Figure 6:
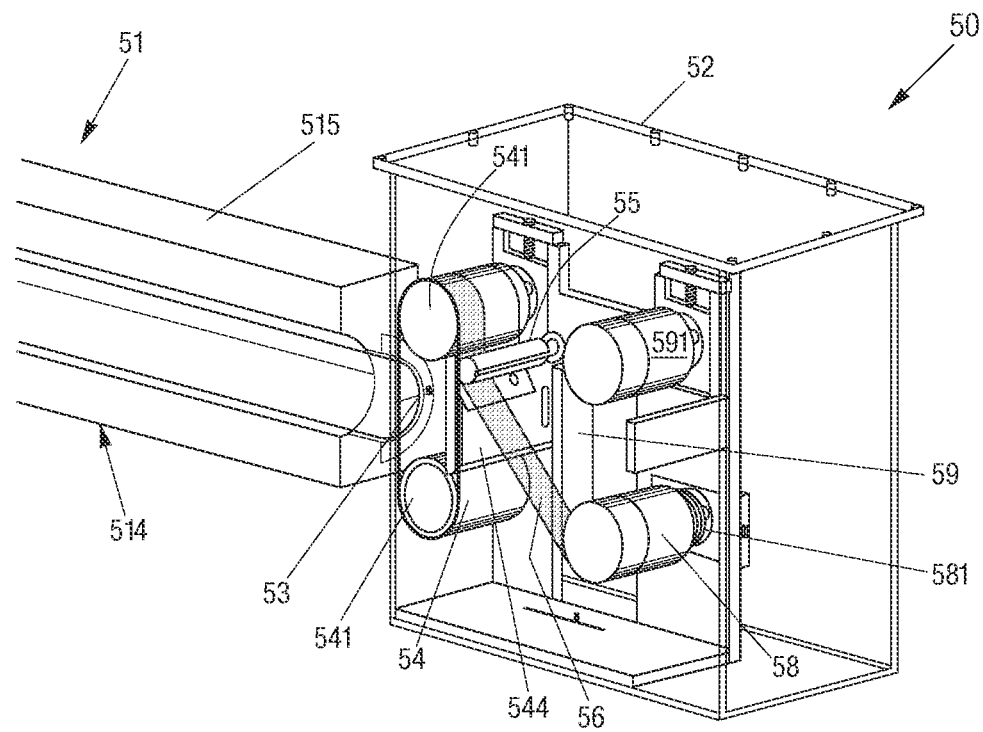

With reference now to FIGS. 5-6, there is illustrated, in accordance with another embodiment of the present invention, a system 50 for collecting synthesized nanotubes made from a CVD process within a synthesis chamber 51, and for subsequently forming bulk fibrous structures or materials from the nanotubes. In particular, system 50 may be used in the formation of a substantially continuous non-woven sheet generated from compacted and intermingled nanotubes and having sufficient structural integrity to be handled as a sheet.

System 50, like system 10, may be coupled to a synthesis chamber 51. Synthesis chamber 51, in general, includes an entrance end, into which reaction gases may be supplied, a hot zone, where synthesis of extended length nanotubes may occur, and an exit end 514 from which the products of the reaction, namely the extended length nanotubes and exhaust gases, may exit and be collected. In one embodiment, synthesis chamber 51 may include a quartz tube 515, extending through in a furnace and may include flanges 517 provided at exit end 514 and entrance end for sealing tube 515. Although illustrated generally in FIG. 5, it should be appreciated that other configurations may be employed in the design of synthesis chamber 51.

System 50, in one embodiment of the present invention, includes a housing 52. Housing 52, as illustrated in FIG. 5, may be substantially airtight to minimize the release of potentially hazardous airborne particulates from within the synthesis chamber 51 into the environment, and to prevent oxygen from entering into the system 50 and reaching the synthesis chamber 51. In particular, the presence of oxygen within the synthesis chamber 51 can affect the integrity and compromise the production of the nanotubes.

System 50 may also include an inlet 53 for engaging the flanges 517 at exit end 514 of synthesis chamber 51 in a substantially airtight manner. In one embodiment, inlet 53 may include at least one gas exhaust 531 through which gases and heat may leave the housing 52. Gas exiting from exhaust 531, in an embodiment, may be allowed to pass through a liquid, such as water, or a filter to collect nanomaterials not gathered upstream of the exhaust 531. In addition, the exhaust gas may be treated in a manner similar to that described above. Specifically, the exhaust gas may be treated with a flame in order to de-energize various components of the exhaust gas, for instance, reactive hydrogen may be oxidized to form water.

System 50 may further include a moving surface, such as belt 54, situated adjacent inlet 53 for collecting and transporting the nanomaterials, i.e., nanotubes, from exit end 514 of synthesis chamber 51. To collect the nanomaterials, belt 54 may be positioned at an angle substantially transverse to the flow of gas carrying the nanomaterials from exit end 514 to permit the nanomaterials to be deposited on to belt 54. In one embodiment, belt 54 may be positioned substantially perpendicularly to the flow of gas and may be porous in nature to allow the flow of gas carrying the nanomaterials to pass therethrough and to exit from the synthesis chamber 51. The flow of gas from the synthesis chamber 51 may, in addition, exit through exhaust 531 in inlet 53.

To carry the nanomaterials away from the inlet 53 of system 50, belt 54 may be designed as a continuous loop similar to a conventional conveyor belt. To that end, belt 54, in an embodiment, may be looped about opposing rotating elements 541 and may be driven by a mechanical device, such as an electric motor 542, in a clockwise manner, as illustrated by arrows 543. Alternatively, a drum (not shown) may be used to provide the moving surface for transporting the nanomaterial. Such a drum may also be driven by a mechanical device, such as electric motor 542. In an embodiment, motors 542 may be controlled through the use of a control system, similar to that used in connection with mechanical drives 18 and 19, so that tension and velocity can be optimized.

Still looking at FIG. 5, system 50 may include a pressure applicator, such as roller 55, situated adjacent belt 54 to apply a compacting force (i.e., pressure) onto the collected nanomaterials. In particular, as the nanomaterials get transported toward roller 55, the nanomaterials on belt 54 may be forced to move under and against roller 55, such that a pressure may be applied to the intermingled nanomaterials while the nanomaterials get compacted between belt 54 and roller 55 into a coherent substantially-bonded non-woven sheet 56 (see FIG. 6). To enhance the pressure against the nanomaterials on belt 54, a plate 544 may be positioned behind belt 54 to provide a hard surface against which pressure from roller 55 can be applied. It should be noted that the use of roller 55 may not be necessary should the collected nanomaterials be ample in amount and sufficiently intermingled, such that an adequate number of contact sites exists to provide the necessary bonding strength to generate the non-woven sheet 56.

To disengage the non-woven sheet 56 of intermingled nanomaterials from belt 54 for subsequent removal from housing 52, a scalpel or blade 57 may be provided downstream of the roller 55 with its edge against surface 545 of belt 54. In this manner, as non-woven sheet 56 moves downstream past roller 55, blade 57 may act to lift the non-woven sheet 56 from surface 545 of belt 54.

Additionally, a spool or roller 58 may be provided downstream of blade 57, so that the disengaged non-woven sheet 56 may subsequently be directed thereonto and wound about roller 58 for harvesting. Of course, other mechanisms may be used, so long as the non-woven sheet 56 can be collected for removal from the housing 52 thereafter. Roller 58, like belt 54, may be driven, in an embodiment, by a mechanical drive, such as an electric motor 581, so that its axis of rotation may be substantially transverse to the direction of movement of the non-woven sheet 56.

In order to minimize bonding of the non-woven sheet 56 to itself as it is being wound about roller 58, a separation material 59 (see FIG. 6) may be applied onto one side of the non-woven sheet 56 prior to the sheet 56 being wound about roller 58. The separation material 59 for use in connection with the present invention may be one of various commercially available metal sheets or polymers that can be supplied in a continuous roll 591. To that end, the separation material 59 may be pulled along with the non-woven sheet 56 onto roller 58 as sheet 56 is being wound about roller 58. It should be noted that the polymer comprising the separation material 59 may be provided in a sheet, liquid, or any other form, so long as it can be applied to one side of non-woven sheet 56. Moreover, since the intermingled nanotubes within the non-woven sheet 56 may contain catalytic nanoparticles of a ferromagnetic material, such as Fe, Co, Ni, etc., the separation material 59, in one embodiment, may be a non-magnetic material, e.g., conducting or otherwise, so as to prevent the non-woven sheet 56 from sticking strongly to the separation material 59.

Furthermore, system 50 may be provided with a control system (not shown), similar to that in system 10, so that rotation rates of mechanical drives 542 and 581 may be adjusted accordingly. In one embodiment, the control system may be designed to receive data from position sensors, such as optical encoders, attached to each of mechanical drives 542 and 581. Subsequently, based on the data, the control system may use a control algorithm in order to modify power supplied to each drive in order to control the rate of each drive so that they substantially match the rate of nanotube collection on belt 54 to avoid compromising the integrity of the non-woven sheet as it is being wound about the spool. Additionally, the control system can act to synchronize a rate of spin of the roller 58 to that of belt 54. In one embodiment, tension of the non-woven sheet 56 can be reset in real time depending on the velocity values, so that the tension between the belt 54 and roller 58 can be kept within a set value.

The control system can also vary the rate between the roller 58 and belt 54, if necessary, to control the up-take of the non-woven sheet 56 by roller 58. In addition, the control system can cause the roller 58 to adjust slightly back and forth along its axis, so as to permit the non-woven sheet 56 to evenly remain on roller 58.

To the extent desired, an electrostatic field (not shown) may be employed to align the nanotubes, generated from synthesis chamber 51, approximately in a direction of belt motion. The electrostatic field may be generated, in one embodiment, by placing, for instance, two or more electrodes circumferentially about the exit end 514 of synthesis chamber 51 and applying a high voltage to the electrodes. The voltage, in an embodiment, can vary from about 10 V to about 100 kV, and preferably from about 4 kV to about 6 kV. If necessary, the electrodes may be shielded with an insulator, such as a small quartz or other suitable insulator. The presence of the electric field can cause the nanotubes moving therethrough to substantially align with the field, so as to impart an alignment of the nanotubes on moving belt 54.

System 50, as noted, can provide bulk nanomaterials of high strength in a non-woven sheet. By providing the nanomaterials in a non-woven sheet, the bulk nanomaterials can be easily handled and subsequently processed for end use applications, including (i) structural systems, such as fabrics, armor, composite reinforcements, antennas, electrical or thermal conductors, and electrodes, (ii) mechanical structural elements, such as plates and I-beams, and (iii) cabling or ropes. Other applications can include hydrogen storage, batteries, or capacitor components.

Moreover, the non-woven sheet may be incorporated into composite structures for additional end use applications, such as sporting goods products, helmets, etc. In one embodiment, a composite material may be formed by impregnating the non-woven sheet with a matrix precursor, such as Krayton, vinyl ester, PEEK, bispolyamide, BMI (bismaleimide), epoxies, or polyamides, and subsequently allowing the matrix to polymerize or thermally cure.

In an alternate embodiment, a layered composite of materials may be formed by sintering non-woven sheets together with a matrix material. For example, adjacent layers of non-woven sheets may be separated with a sheet of matrix precursor and subsequently sintered in a hot press under isostatic pressure.

It should also be noted that, although structural applications are discussed herein, the nanomaterial based yarn and non-woven sheets may be used in numerous other applications which require structures to be formed from nanomaterials. Such structures may be used, for instance, in electrical applications as conducting materials, or as electrodes of a capacitor, or battery or fuel cell. In such an instance, since the nanomaterials provided in the electrode structure has a substantially high surface area, the nanomaterials can provide capacitors or batteries with a substantially large area to which electrons or ions might localize in order to store charge or transfer charge to or from the electrode. The high surface area or surface chemistry of nanomaterials in bulk macroscale structures may also be a useful property in mechanical filtration applications.

Furthermore, because nanomaterials, such as carbon nanotubes are known to have extremely high heat transfer coefficients, bulk structures produced with the system of the present invention may also be useful as conductors of phonons or thermal energy.

It should also be appreciated that yarns and tows made from synthesized nanomaterials of the present invention, especially those with nanotubes preferentially aligned along the axis of the yarn, may be incorporated as bulk assemblies having fibers oriented substantially parallel to one another, such as in a woven fabric. In addition, macroscale structures may be made from non-woven sheets of the present invention having aligned fibers. Since these structures of parallel conducting fibers have controlled spacing based on, for example, the amount of nanomaterials, the spacing of yarns in a weave, or the thickness of individual yarns, the presence of aligned fibers in these assemblies or macroscale structures may impart interesting properties to the assemblies and macroscale structures.

For example, in electrical applications, parallel conductors may be used as polarizing filters, diffraction gratings, and occasionally objects with large backscatter cross-sections. All of these applications may be dependent on the wavelength of incident electromagnetic waves, and the spacing, diameter and length of the parallel conductors which interact with the waves. By controlling the spacing between parallel conducting fibers, the interaction of an assembly of these fibers with electromagnetic radiation of specific frequencies may be controlled. For instance, a polarizing filter for terahertz frequency electromagnetic radiation may be defined by a thread size and tightness of a weave of nanotube yarns. Using, for example, 100 micron diameter yarns woven at a 300 micron pitch should be sufficient to polarize radiation with wavelengths in the vicinity of 300 microns, which corresponds to a 1 THz electromagnetic wave.

As a second example, aligned nanotubes within a non-woven sheet or yarn may have spacings and nanotube diameters on the order of several nanometers, but much longer conducting paths along the axis of the nanotubes. By providing aligned nanotubes in a non-woven sheet or within a continuous yarn, a diffraction grating may be provided that can interact strongly with x-rays. These bulk structures, therefore, can easily be formed to provide diffraction gratings and polarizers for x-rays. Moreover, because perpendicular polarizers can block transmission of the electromagnetic waves incident on the polarizers and with which each polarizer interacts, it may be possible to block x-rays using two non-woven sheets of aligned nanotubes, provided that the nanotubes in the first sheet may be oriented substantially perpendicularly to the nanotubes in the second sheet. A tightly woven fabric of yarns of aligned nanotubes may also have a similar effect. As such, it may be possible to use bulk structures having aligned nanotubes in broad-spectrum electromagnetic absorption shielding for x-rays, ultraviolet, visible light, infrared, terahertz, microwave radiation, and radar and radio frequencies.

In another embodiment, the nanofibrous materials of the present invention having aligned nanotubes may be incorporated for use in anisotropic composites and thermal conductors, and especially in gratings, filters, and shields of electromagnetic radiation, or other waves, such as electrons or neutrons with wavelengths greater than, for instance, 0.1 nm.

While the invention has been described in connection with the specific embodiments thereof, it will be understood that it is capable of further modification. Furthermore, this application is intended to cover any variations, uses, or adaptations of the invention, including such departures from the present disclosure as come within known or customary practice in the art to which the invention pertains.

What is claimed is:

1. A system for forming a nanofibrous non-woven sheet, the apparatus comprising:
 a housing having an inlet for engaging an independent synthesis chamber within which nanotubes are produced;
 a moving surface positioned adjacent the inlet within the housing for collecting and transporting the nanotubes flowing from the synthesis chamber;
 a pressure applicator situated adjacent the moving surface to apply a force against the collected nanotubes on the moving surface, so as to compact the nanotubes into a non-woven sheet of intermingled nanotubes;
 a spool positioned within the housing and downstream of the pressure applicator for winding thereonto the non-woven sheet;

a separator for applying a material onto one side of the non-woven sheet prior to the sheet being wound about the spool to minimize bonding of the non-woven sheet to itself on the spool; and a sensor system designed to provide feedback data to control a rate of spin of the moving surface and spool, so as to avoid compromising the integrity of the non-woven sheet as it is being wound about the spool.

2. A system as set forth in claim 1, wherein the housing is substantially airtight to minimize the airborne release of nanotubes and related particulates generated from within the chamber.

3. A system as set forth in claim 1, wherein the moving surface is positioned at an angle substantially transverse to the flow of nanotubes from the synthesis chamber to permit the nanotubes to be deposited thereon.

4. A system as set forth in claim 1, wherein the moving surface is a belt disposed about opposing rotating elements.

5. A system as set forth in claim 4, wherein the belt is porous to permit gas flowing from the synthesis chamber to pass therethrough.

6. A system as set forth in claim 1, the pressure applicator includes a plate positioned behind the moving surface to provide a hard surface against which pressure from the applicator can be applied.

7. A system as set forth in claim 1, wherein the spool has an axis of rotation that is substantially transverse to the direction of movement of the non-woven sheet.

8. A system as set forth in claim 1, further including a blade downstream of the pressure applicator and having an edge against the moving surface to lift and disengage the non-woven sheet from the moving surface for subsequent winding about the spool.

9. A system as set forth in claim 1, wherein the sensor system is designed to provide data to control tension of the non-woven sheet between the moving surface and the spool.

10. A system as set forth in claim 1, wherein the sensor system is designed to provide data that can be used to synchronize a rate of spin of the spool to that of the moving surface.

11. A system as set forth in claim 1, wherein the sensor system is designed to provide data that can be used to synchronize a rate of spin of the moving surface and spool to that substantially similar to the rate of deposit of nanotubes onto the moving surface.

* * * * *